UNITED STATES PATENT OFFICE.

WILLARD E. CASE, OF AUBURN, NEW YORK.

PROCESS OF MANUFACTURING ALUMINIUM.

SPECIFICATION forming part of Letters Patent No. 512,802, dated January 16, 1894.

Application filed March 13, 1893. Serial No. 465,809. (No specimens.)

*To all whom it may concern:*

Be it known that I, WILLARD E. CASE, of the city of Auburn, New York, have invented certain new and useful Improvements in Processes for the Manufacture of Aluminium, of which the following is a specification.

My improved process is as follows: I dissolve aluminium sulphate in water and add thereto calcium fluoride, preferably heating the solution to a temperature of 180° Fahrenheit to expedite the reaction, and preferably maintaining it at this temperature for several hours. The reaction which takes place may probably be represented by the following equation:

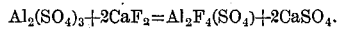

$$Al_2(SO_4)_3 + 2CaF_2 = Al_2F_4(SO_4) + 2CaSO_4.$$

I then separate, by filtration or otherwise, the precipitated calcium sulphate, (together with such excess of calcium fluoride as remains undecomposed,) from the resulting fluorsulphate solution. For the next step I prefer to have the solution at a specific gravity of about 1.040, and at about the normal temperature. I next prepare an aqueous solution of an alkali carbonate, such as sodium carbonate, or soda-ash, and I prefer for this purpose to use a saturated solution for convenience simply. If iron is present,—and if the aluminium sulphate and calcium fluoride are of the usual commercial qualities they may either of them contain iron as an impurity,—I proceed to remove such iron by the following operation: I add the alkali carbonate solution to the fluor sulphate solution, (which causes a reddish ferruginous precipitate,) until upon removing, filtering, and testing a sample of this solution with potassium ferrocyanide it shows itself substantially free from iron in the ferric form; and then by filtration or otherwise, I remove the said iron precipitate. My application, Serial No. 390,984, filed April 29, 1891, relates to the foregoing process. The alkali carbonate solution is now added to the fluorsulphate solution until it ceases to bring down a further quantity of a white precipitate, and this white precipitate I prefer to remove at once from said solution by filtration or otherwise. This white precipitate is rich in aluminium and free from such iron as may have been present in a crude aluminium sulphate, if such has been used. This product having been dried, is submitted to the process of electrolysis by placing it in a suitable cell and passing a suitable current of electricity through it, which fuses and then electrolyzes the contents of the cell and as this operation is well known it is not thought necessary to be more explicit in these instructions. The electrolysis will be expedited if a quantity of cryolite be added to the contents of the cell in the first instance, as it aids the liquefaction of the first portions, but it will be found unnecessary to add further portions of the cryolite as the electrolysis proceeds, for this product possesses the quality of forming its own bath in sufficient quantity during the electrolysis. By removing the reduced aluminium and adding successive portions of the white precipitate as the electrolysis proceeds this process becomes continuous and may be prolonged indefinitely.

I claim—

1. The process herein described of making aluminium, which consists in combining aluminium sulphate and calcium fluoride to form an aluminium fluorsulphate solution, adding thereto an alkali carbonate, and then removing fusing and electrolyzing the precipitate.

2. The process herein described of making aluminium, which consists in combining aluminium sulphate and calcium fluoride to form an aluminium fluorsulphate solution, adding thereto an alkali carbonate to precipitate the iron, removing said iron precipitate, adding a further quantity of alkali carbonate to precipitate the aluminium product, and removing fusing and electrolyzing the same.

3. The process herein described of making aluminium, which consists in combining aluminium sulphate and calcium fluoride to form an aluminium fluorsulphate solution, adding thereto sodium carbonate, and then removing fusing and electrolyzing the precipitate.

4. The process herein described of making aluminium, which consists in combining aluminium sulphate and calcium fluoride to form an aluminium fluorsulphate solution, adding thereto sodium carbonate to precipitate the iron, removing said iron precipitate, adding a further quantity of sodium carbonate to precipitate the aluminium product, and removing fusing and electrolyzing the same.

WILLARD E. CASE.

Witnesses:
FREDERICK I. ALLEN,
JNO. VAN SICKLE.